US012416506B2

(12) United States Patent
Akbarzadeh et al.

(10) Patent No.: US 12,416,506 B2
(45) Date of Patent: Sep. 16, 2025

(54) TRANSLATING ROUTE INFORMATION BETWEEN DATA STRUCTURES FOR AUTONOMOUS SYSTEMS AND APPLICATIONS

(71) Applicant: NVIDIA Corporation, Santa Clara, CA (US)

(72) Inventors: Amir Akbarzadeh, San Jose, CA (US); Raul Correal Tezanos, San Jose, CA (US); Hon Leung Lee, Bellevue, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 99 days.

(21) Appl. No.: 17/658,997

(22) Filed: Apr. 12, 2022

(65) Prior Publication Data

US 2023/0324194 A1 Oct. 12, 2023

(51) Int. Cl.
*G01C 21/34* (2006.01)
*G01C 21/36* (2006.01)

(52) U.S. Cl.
CPC ..... *G01C 21/3492* (2013.01); *G01C 21/3415* (2013.01); *G01C 21/3635* (2013.01); *G01C 21/367* (2013.01)

(58) Field of Classification Search
CPC ............ G01C 21/3492; G01C 21/3415; G01C 21/3635; G01C 21/367
See application file for complete search history.

(56) References Cited

U.S. PATENT DOCUMENTS

| 11,768,076 | B2 * | 9/2023 | Johnson | G01C 21/3804 |
| | | | | 701/533 |
| 2001/0047241 | A1 * | 11/2001 | Khavakh | G01C 21/3415 |
| | | | | 701/410 |
| 2018/0188040 | A1 * | 7/2018 | Chen | G06T 7/246 |
| 2018/0300964 | A1 * | 10/2018 | Lakshamanan | H04L 67/12 |
| 2018/0364734 | A1 * | 12/2018 | Ferguson | G05D 1/0274 |
| 2019/0383631 | A1 * | 12/2019 | Bigio | G06V 20/59 |
| 2020/0173796 | A1 * | 6/2020 | Beaurepaire | G01C 21/3415 |
| 2020/0225044 | A1 * | 7/2020 | Tohriyama | G01C 21/3848 |
| 2021/0262815 | A1 * | 8/2021 | Lee | G01C 21/367 |
| 2023/0140162 | A1 * | 5/2023 | Malson | G01C 21/3453 |

OTHER PUBLICATIONS

Marchal et al. "Efficient map matching of large global positioning system data sets: Tests on speed-monitoring experiment in Zürich." Transportation Research Record 1935.1 (2005): pp. 93-100, Zürich.

* cited by examiner

*Primary Examiner* — Anne Marie Antonucci
*Assistant Examiner* — Misa H Nguyen
(74) *Attorney, Agent, or Firm* — Maschoff Brennan

(57) ABSTRACT

Embodiments of the present disclosure relate to a method of translating routes between maps. The method may include obtaining a graph based on data of an area. The graph may include one or more nodes representing different locations along one or more navigable paths as defined by the map. The method may also include obtaining one or more waypoints that define a route to traverse in the area and selecting, from the nodes, one or more path nodes based on locations of the path nodes corresponding to locations of the waypoints. The selected path nodes may define a path in the data that corresponds to the route.

18 Claims, 12 Drawing Sheets

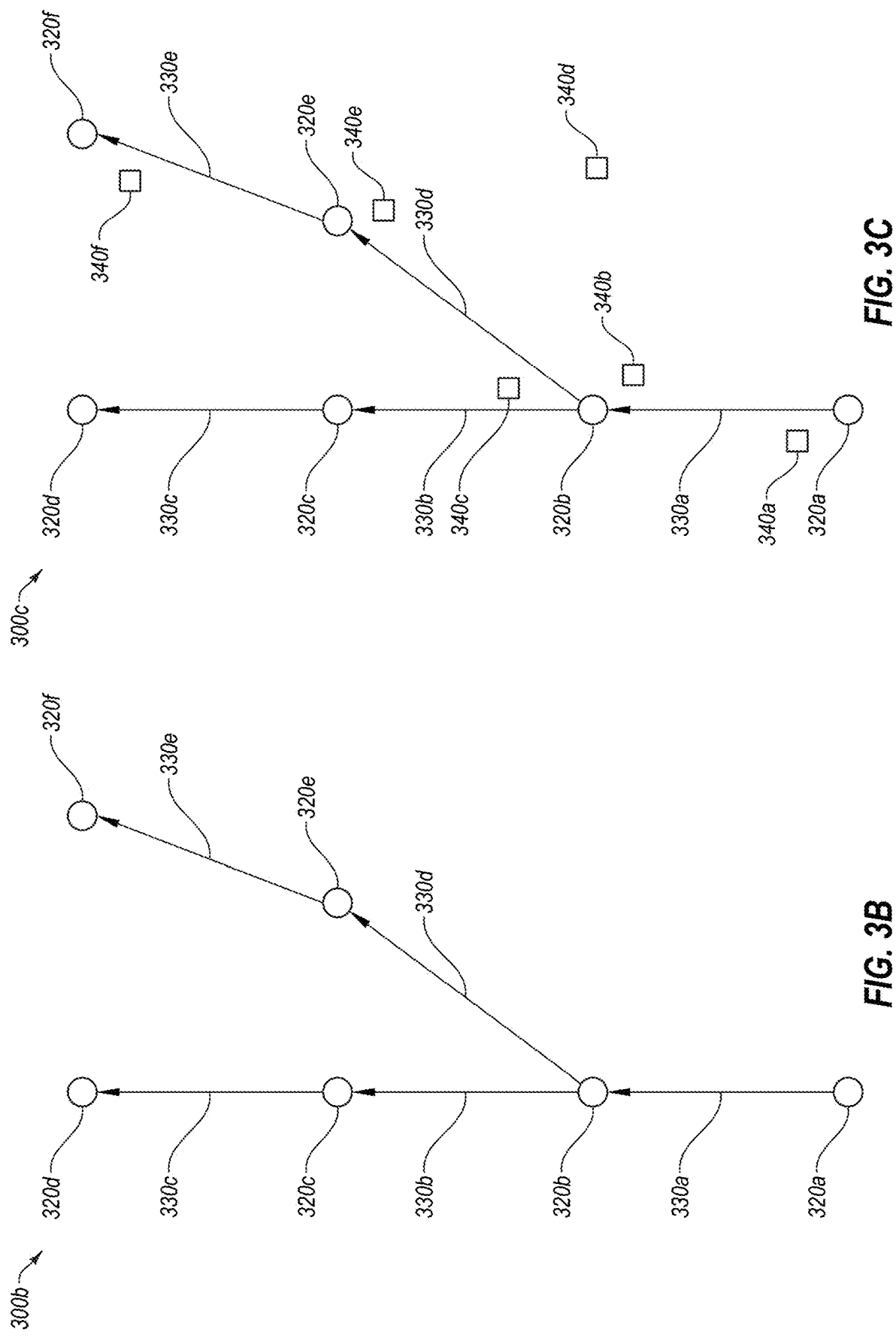

TRANSLATING ROUTE INFORMATION BETWEEN DATA STRUCTURES FOR AUTONOMOUS SYSTEMS AND APPLICATIONS

BACKGROUND

Autonomous vehicles (e.g., vehicles that perform self-driving operations) often use map data (e.g., high definition (HD) map data with a precision level within 2-30 cm) that represents a region to navigate within that region. The map data may include spatial geometric information about the areas in which the autonomous vehicles may travel. The spatial geometric information may be used by an autonomous vehicle or other machine to reduce computation overhead required during real-time processing applications, tasks, and operations to avoid obstacles and navigate an area safely.

SUMMARY

Embodiments of the present disclosure relate to translating route information between data structures representative of an area. One or more embodiments may be implemented as a method to translate routes between data structures that include obtaining a graph based on data of an area. In one or more implementations, the graph may include one or more nodes representing different locations along navigable paths as defined by the data. One or more implementations of the method may also include obtaining one or more waypoints that define a route to traverse in the area and selecting, from the one or more nodes, one or more path nodes based on locations of the path nodes corresponding to locations of the way points. In one or more implementations, the selected path nodes may define a path in the data that corresponds to the route.

BRIEF DESCRIPTION OF THE DRAWINGS

The present systems and methods for yield scenario encoding for autonomous systems are described in detail below with reference to the attached drawing, wherein:

FIG. 3B illustrates a road graph based on the road section of FIG. 3A, in accordance with some embodiments of the present disclosure;

FIG. 3C illustrates the road graph of FIG. 3B with waypoints from a navigational map, in accordance with some embodiments of the present disclosure;

DETAILED DESCRIPTION

Figure 1:
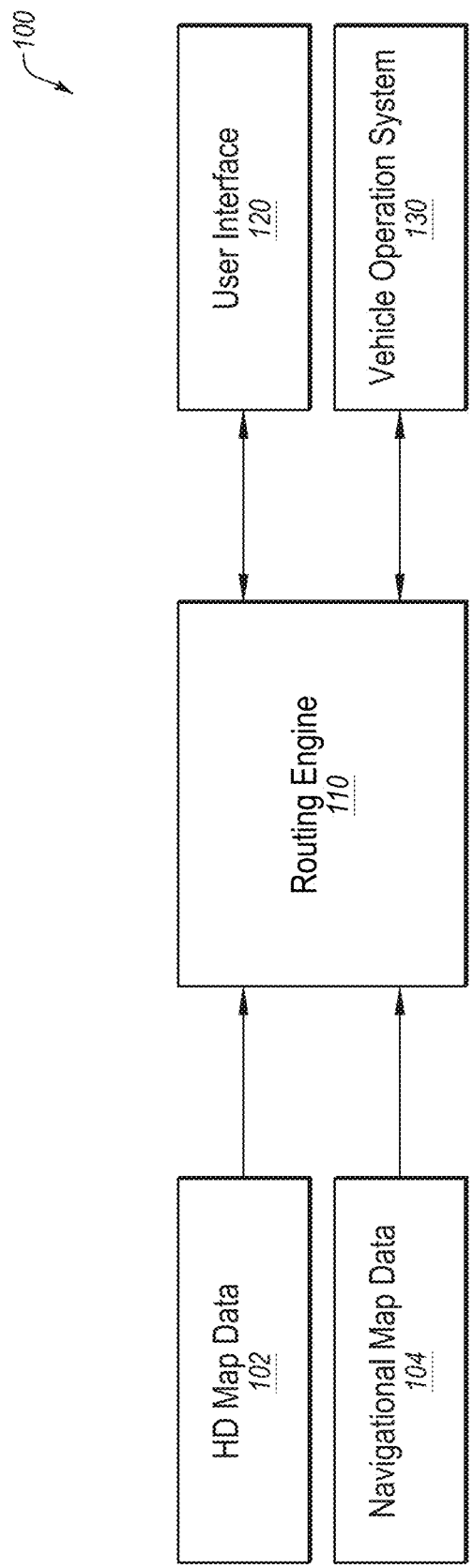
FIG. 1 illustrates an example environment for translating routes between maps, in accordance with some embodiments of the present disclosure.

An autonomous or semi-autonomous machine (e.g., machines that perform self-driving operations) may perform operations that allow the machine to travel to a particular destination and/or to perform certain actions or otherwise perceive and manipulate other objects in the immediate environment. In an example driving or navigation scenario, before traveling to the particular destination, a route that follows known roads may be selected. For example, a user may interface with a navigational map to select an address. With the known location of the vehicle and an address, the navigational map may select a route to follow to the address. The navigational map may provide information about distances to travel on particular roads, when to turn from a first road to a second road, etc. to arrive at the address. Thus, the navigational map may provide high-level details about the route that may allow the vehicle to travel to the address.

However, the navigational map may not provide low-level details about the route that may be used by the vehicle to travel to the address. For example, the vehicle may use map data (e.g., high definition (HD) map data with a precision level within 2-30 cm) that represents a region to navigate within that region. The map data may include spatial geometric information about the areas at which the autonomous vehicles may travel. The spatial geometric information may be used by an autonomous vehicle to avoid obstacles and navigate with reduced chance of collision. Thus, the vehicle may use HD map data to navigate the route selected by the navigational map.

In some instances, an HD map and a navigational map may not be synchronized, such that not every road, address, and point of a navigational map is precisely associated with the corresponding road, address, and point in an HD map. For example, the HD map and a navigational map may not be synchronized due to being created and/or updated at different times, where the underlying physical landscape may have been changed or developed in the intervening periods. Alternately or additionally, the HD map and a navigational map may not be synchronized based on the HD map and a navigational map not including coverage of the same geographic locations.

According to one or more embodiments of the present disclosure, methods and systems are disclosed that translate route information between maps and/or data structures representative of a geographic area. For example, a route in a navigational map may be matched with a route in an HD map. In some embodiments, to match a route in a navigational map to a route in a HD map, a graph that includes one or more nodes may be generated using the HD map. In these and other embodiments, the graph may include one or more edges. Each of the nodes may represent a different location along the navigable path in the HD map and each of the edges may connect two of the nodes and may represent a direction of travel in the HD map. In these and other embodiments, one or more waypoints from a navigational map may be obtained. The waypoints may define a route for travel by a vehicle. In these and other embodiments, locations of the waypoints may be defined in a coordinate system that is used by the HD map. For example, a terrestrial reference system and/or geodetic datum coordinate system may be used.

After obtaining the graph and the waypoints, nodes from the graph that define a path in the HD map that correspond to the route in the navigational map may be selected. In some embodiments, the nodes may be selected based on the nodes each corresponding to one or more of the waypoints of the route in the navigational map. Alternately or additionally, one or more of the nodes may be selected based on the selection of other nodes that correspond to waypoints to complete a path in the HD map. Selecting the nodes to define a path in the HD map may translate the route from the navigational map to the HD map.

Although the present disclosure may be described with respect to an example autonomous vehicle, such as the autonomous vehicle 500 (alternatively referred to herein as the "vehicle 500" or the "ego-vehicle 500," an example of which is described with respect to FIGS. 5A-5D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other robot, machine, or vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems. Further, reference in the present disclosure to an "autonomous vehicle" includes any vehicle that has the capability to perform some sort of maneuvering operation (e.g., turning, braking, accelerating, etc.) without direct control by an operator. As such, reference to "autonomous vehicles" is not limited to fully autonomous vehicles.

With reference to FIG. 1, FIG. 1 illustrates an example environment 100 for translating route information between maps and/or data structures representative of a geographic area, in accordance with some embodiments of the present disclosure. The environment 100 may include High-Definition (HD) map data 102, navigational map data 104, a routing engine 110, a user interface 120, and a vehicle operation system 130.

The map data 102 may include data representing one or more geographical areas with a relatively high level of precision and resolution (e.g., a precision level within 2-50 cm) that may be used by a vehicle or other machine to perform maneuvering operation (e.g., turning, braking, accelerating, etc.) without direct control by an operator of the vehicle or machine. The map data 102 may include traditional information related to the corresponding geographical areas such as roads, geographical features, buildings, etc. In these or other embodiments, the map data 102 may include information describing driving lanes including spatial locations of lanes and semantic information about each lane. The spatial location of a respective lane may include the geometric location in latitude, longitude and/or the elevation of the respective lane, with a relatively high precision, for example, at or below 50 cm precision. The semantic information of a respective lane may include lane restrictions such as direction of travel of the respective lane, speed restrictions associated with the respective lane, type of lane (for example, a lane for going straight, a left turn lane, a right turn lane, an exit lane, and the like), restrictions on crossing to the left, connectivity to other lanes and so on.

In these or other embodiments, the map data 102 may include semantic information describing stop lines, yield lines, spatial locations of crosswalks and/or driveways, safely navigable space, spatial locations of speed bumps, curbs. In these or other embodiments, the semantic information of the map data 102 may describe road signs including spatial locations of the road signs and type of signage that may be relevant to driving restrictions. Examples of road signs described by the map data 102 may include stop signs, traffic lights, speed limit signs, one-way signs, do-not-enter signs, yield signs (vehicle, pedestrian, animal), and so on.

In some embodiments, the map data 102 may include junction data related to junction areas of the respective geographical regions. As indicated above, the junction areas may include any area that may correspond to a potential yield scenario that may be encountered by a vehicle traversing the corresponding area. An example of the map data 102 may include the map information 594 of FIG. 5. The map data 102 may be based on a terrestrial reference system and/or geodetic datum coordinate system. For example, the map data 102 may be based on the World Geodetic System (WGS 84) coordinate system, the Universal Transverse Mercator coordinate system, or some other coordinate system.

The navigational map data 104 may include data representing one or more geographical areas with respect to roads, paths, buildings, parks, geographical features, and other structures and/or elements. The navigational map data 104 may further include information regarding traffic patterns along the roads and/or paths. The navigational map data 104 may be based on the same coordinate system as the map data 102.

The navigational map data 104 may be generated, provided, and/or maintained by an entity that is different or the same as the entity that provides the map data 102. For example, the navigational map data 104 may be generated, provided, and/or maintained by an entity that generates navigational maps for use by the public, such as Google®, Apple®, TomTom®, or some other company. The map data 102 may be generated, provided, and/or maintained by the same entity. Alternately or additionally, the map data 102 may be generated, provided, and/or maintained by a different entity, such as a company associated with a vehicle that uses the map data 102.

In some embodiments, the navigational map data 104 may include a route between two locations. The route may be configured to follow roads that are included in the navigational map data 104 based on the traffic patterns associated with the roads. The route may be selected based on one or more criteria, such as distance, time, fuel economy, etc. The route may be defined based on one or more waypoints defined in the coordinate system used by the navigational map data 104. In these and other embodiments, the waypoints may be locations within the coordinate system that when followed may result in following the route between the two locations. The waypoints may be equally spaced, unequally spaced, or some combination thereof along the route. Distances between the waypoints may be based on the route, the roads along the route, such as a number of intersections or alternative roads for deviating from the route. In these and other embodiments, the navigational map data 104 may be the same as the data that may be provided to a phone of a user for navigation or a navigational system of a vehicle that does not operate using the map data 102.

In some embodiments, the navigational map data 104 may be provided by a navigational application. For example, a user may interact with the navigational application, for example using a user interface, such as the user interface 120, to provide a destination location and/or a current location to the navigational application. The navigational application may generate the navigational map data 104 that includes the route as defined by the waypoints. In some embodiments, the navigational map data 104 may include only the waypoints of the route. Alternately or additionally, the navigational map data 104 may include the waypoints of the route and additional information, such as data representing the geographical areas along the route, traffic information in the geographical areas, instructions regarding when to perform turns, among other information.

The routing engine 110 may include code and routines configured to enable a computing system to perform one or more operations. Additionally or alternatively, the routing engine 110 may be implemented using hardware including a processor, a microprocessor (e.g., to perform or control performance of one or more operations), a field-programmable gate array (FPGA), or an application-specific integrated circuit (ASIC). In some other instances, the routing engine 110 may be implemented using a combination of hardware and software. In the present disclosure, operations described as being performed by the routing engine 110 may include operations that the routing engine 110 may direct a corresponding system to perform.

The user interface 120 may be configured to obtain input from a user and present information to a user. For example, a user may be an operator of vehicle in which the example environment 100 is implemented. The user interface 120 may be one or more elements configured to obtain user input and present information to a user.

The vehicle operation system 130 may include one or more systems that allow a vehicle or other machine to perform maneuvering operations (e.g., turning, braking, accelerating, etc.) without direct control by an operator. For example, the vehicle operation system 130 may include one or more of the sensors and/or systems described with respect to FIGS. 5A-5D that allow a vehicle to perform maneuvering operations.

In some embodiments, the routing engine 110 may be configured to obtain the map data 102 and the navigational map data 104. The routing engine 110 may be configured to match the route from the navigational map data 104 to a path within the map data 102. For example, the routing engine 110 may perform an algorithm to match the route from the navigational map data 104 to a path within the map data 102. In some embodiments, any matching algorithm may be used to match the route from the navigational map data 104 to a path within the map data 102. An example matching algorithm is described with respect to the method 200*b* described in further detail below with respect to FIG. 2B.

In some embodiments, the matching algorithm may be configured to select locations along roads from the map data 102 that are similar and/or the same as the locations as the waypoints from the navigational map data 104. The locations along roads from the map data 102 that are similar and/or the same as the locations as the waypoints may be referred to as path nodes that may define a path in the map data 102 that corresponds to the route from the navigational map data 104.

In some embodiments, the matching algorithm may be configured to match the waypoints with nodes from a graph derived from the map data 102. The matching nodes, referred to as path nodes, may define a path in the map data 102 that corresponds to the route from the navigational map data 104. In these and other embodiments, the graph may be generated by the routing engine 110. Alternately or additionally, the map data 102 may include the graph that is obtained by the routing engine 110. Alternately or additionally, the graph may be the map data 102 that is provided to the routing engine 110.

In some embodiments, the graph may include nodes. Each of the nodes may correspond to different locations along roads within the map data 102. The nodes may be connected with edges that have a direction corresponding to the direction of traffic along the road between the nodes. A matching algorithm may select nodes from among the nodes of the graph that correspond to the waypoints. The nodes that correspond to the waypoints may be defined as path nodes. Alternately or additionally, one or more nodes may be defined as path nodes based on the one or more nodes corresponding to nodes that correspond to the waypoints. The path nodes may define a path that may correspond to the route defined by the waypoints. For example, the path nodes that are coupled together by way of one or more edges of the graph may define a path that may correspond to the route defined by the waypoints. In these and other embodiments, the edges that along with the path nodes define a path may be referred to as path edges. In these and other embodiments, the edges may be directional edges indicating a direction of travel.

In some embodiments, a path node may correspond to a waypoint based on a correlation between a location of the path node and a location of the waypoint. The correlation between the location of the path node and the location of the waypoint may be based on a distance between the location of the path node and the location of the waypoint. For example, the smaller the distance between the location of the path node and the location of the waypoint, the stronger the correlation between the path node and the waypoint. Thus, in some embodiments, the matching algorithm may select one or more nodes as path nodes that minimize a distance between the path nodes and the waypoints.

In some embodiments, a path node may correspond to one or more path nodes that correspond to a waypoint. For example, a sequence of nodes may follow a roadway. A first node and a third node of the sequence of nodes may correspond to waypoints. A second node between the first and third nodes may not correspond to a waypoint. Based on the second node being between matched nodes, the second node may be selected as a path node.

Alternately or additionally, a matching algorithm may select edges from among the edges of the graph that correspond to the waypoints. The edges that correspond to the waypoints may be defined as path edges. In these and other embodiments, nodes that are coupled to the path edges may be selected as path nodes. The path nodes and path edges may define a path that may correspond to the route defined by the waypoints.

In some embodiments, a path edge may correspond to a waypoint based on a correlation between a location of the path edge and a location of the waypoint. The correlation between the location of the path edge and the location of the waypoint may be based on a distance between the location of the path edge and the location of the waypoint. For example, the smaller the distance between the location of the path edge and the location of the waypoint, the stronger the correlation between the path edge and the waypoint. Thus, in some embodiments, the matching algorithm may select one or more edges as path edges that minimize a distance between the path edges and the waypoints.

In some embodiments, the path nodes in the map data 102 that form a path that corresponds to the route from the navigational map data 104 may be provided to the vehicle operation system 130. In these and other embodiments, the path edges between the path nodes in the map data 102 that form a path that corresponds to the route from the navigational map data 104 may be provided to the vehicle operation system 130. In these and other embodiments, the vehicle operation system 130 may adjust the autonomous behavior of a vehicle based on the path nodes and/or the path edges. For example, the path nodes and/or the path edges may be used by the vehicle operation system 130 to assist in selection of different behaviors that a vehicle may perform. For example, the path nodes and/or the path edges may be used by the vehicle operation system 130 to assist in selection of a lane in a road for a vehicle to traverse.

For example, as a vehicle traverses the path defined by the path nodes and the path edges, the vehicle operation system 130 may select a path node a particular distance ahead of the vehicle. The selected path node may be referred to as target path node. Given a target path node and a current path node associated with a current location of the vehicle, path nodes between the target path node and the current path node and the path edges between the path nodes may be determined. The current path node, the target path nodes, and the path nodes between the target path node and the current path node may be referred to as lane path nodes. Given the set of lane path nodes and the path edges therebetween, the vehicle operation system 130 may generate lane path data that describes lanes of the one or more roads that correspond to the lane path nodes. Given the lane path data, the vehicle operation system 130 may perform lane planning to select a lane for the vehicle to traverse. In some embodiments, the lane path data may be represented by a lane path graph. In these and other embodiments, the vehicle operation system 130 may select a lane based on minimizing time for traversing the lane path nodes or future road exits or changes, among other reasons. Algorithms for selection of lanes for a vehicle that may use a target path node are described in U.S. patent application Ser. No. 17/178,464 filed on Feb. 18, 2021, and entitled "Behavior planning for autonomous vehicles" incorporated by reference in the present disclosure in their entireties.

Note that as the vehicle traverses the path defined by the path nodes and the path edges, the target path node may update as the vehicle moves along the path. As the target path node updates, the lane path nodes may update as well as the lane path data. As such, the vehicle operation system 130 may update the decision process for selection of a lane based on the updated target path node and/or lane path data. The target path node may update periodically at a particular interval or randomly or after a particular number of path nodes are traversed. As a result, the lane planning may be continually updating based on the changes to the lane path data as the vehicle traverses the path.

In some embodiments, having the path nodes and/or the path edges identified by route matching as described in this disclosure may reduce computational complexities in lane planning. For example, without having the path nodes, the lane path data may extend over an entire geographic area over which the vehicle may traverse following the route from the navigational map data 104. For example, if the path nodes in the map data 102 are not identified based on the route, the vehicle operation system 130 may not know the path which may be traversed by the vehicle. As a result, the vehicle operation system 130 may obtain the lane path data for a large area to allow for planning for multiple different scenarios. The large amount of lane path data and complexity in planning may increase computation complexity of the lane planning. With the path nodes, the amount of lane path data used and the complexity of the lane planning may be reduced.

In some embodiments, the map data 102 may include different amounts of data for different geographical regions through which the route from the navigational map data 104 passes. For example, the map data 102 may include different levels of precision and resolution for different geographic regions. For example, for a first geographic region the map data 102 may include a higher level of precision and resolution than for a second geographic region. In these and other embodiments, the routing engine 110 may provide an indication of the path and a level of precision and resolution of the map data 102 to the vehicle operation system 130. Based on the level of precision and resolution of the map data 102, the vehicle operation system 130 may adjust the autonomous behavior of a vehicle.

In some embodiments, adjusting the autonomous behavior of a vehicle may include adjusting a source of data used for the vehicle to perform maneuvering operations. For example, when the vehicle is within a geographic region where the map data 102 includes higher levels of precision and resolution, the vehicle may use the map data 102 to perform maneuvering or other control operations. When the vehicle is within a geographic region where the map data 102 includes lower levels of precision and resolution, the vehicle may use data from sensors, such as one or more of the sensors from FIGS. 5A-5D, to perform maneuvering operations.

In some embodiments, adjusting the autonomous behavior of a vehicle may include adjusting a level of autonomous behavior. For example, when the vehicle is within a geographic region where the map data 102 includes higher levels of precision and resolution, the vehicle may perform a first set of maneuvering operations. In contrast, when the vehicle is within a geographic region where the map data 102 includes lower levels of precision and resolution, the vehicle may perform a second set of maneuvering operations that includes fewer maneuvering operations than the first set. For example, the first set of maneuvering operations may allow for operation of the vehicle independent of user interaction. The second set of maneuvering operations may depend on user interaction for operation of the vehicle.

In some embodiments, the routing engine 110 may provide an indication of the different levels of precision and resolution of the map data 102 with respect to the route provided by the navigational map data 104 to the user interface 120 for presentation to a user. For example, the user interface 120 may indicate the portions of the route from the navigational map data 104 based on the matching between the map data 102 and the navigational map data 104 over which the autonomous behavior of a vehicle may be adjusted. In these and other embodiments, the user interface 120 may indicate the set of maneuvering operations that may be available for the entire route and/or different portions of the route. Alternately or additionally, the user interface 120 may provide a notification regarding when an adjustment to the level of user interaction in operating the vehicle may be appropriate as a vehicle traverses the route. For example, the user interface 120 may provide a notification that in, within, or by a certain distance, time, etc., more user interaction to operate the vehicle may be appropriate.

In some embodiments, the user interface 120 may obtain feedback from the user regarding the route. For example, the user may request a different route that allows for a particular set of maneuvering operations throughout the entire route. Alternately or additionally, the user may select a portion of the route to be adjusted to adjust the set of maneuvering operations that may be available for the selected portion of the route. In these and other embodiments, the routing engine 110 may request for updated navigational map data 104 that adheres to the criteria selected by the user. For example, the routing engine 110 may specify geographic regions through which the route may pass that correspond to regions in the map data 102 with higher levels of precision and resolution. In these and other embodiments, the routing engine 110 may also specify other criteria, such as maximum distance, time, etc. when requesting the updated navigational map data 104.

In some embodiments, the map data 102 may not include data for one or more geographical regions through which the route from the navigational map data 104 passes. For example, the navigational map data 104 may determine a route independent of coverage of the map data 102 such that the map data 102 does not include any data for one or more geographical regions through which the route passes. As a result, during the matching algorithm, there may not be locations in the map data 102, such as nodes from a graph, that correspond, i.e., match, waypoints from the navigational map data 104. In these and other embodiments, the matching algorithm may select multiple paths within the map data 102 that correspond to the waypoints. For example, the navigational map data 104 may include waypoints WP1-WP10. The map data 102 may include nodes N1-N3 that correspond to WP1-WP3 and nodes N5-N7 that correspond to WP8-WP10. The nodes N1-N3 may form a first path and nodes N5-N7 may form a second path. In these and other embodiments, no path may exist in the map data 102 that corresponds to the WP4-WP7.

In these and other embodiments, when no path exists in the map data 102 that corresponds to one or more waypoints, the autonomous behavior of a vehicle may be adjusted. The autonomous behavior of a vehicle may be adjusted in a similar manner as when the map data 102 includes lower levels of precision and resolution. As another example, when no path exists in the map data 102 that corresponds to one or more waypoints, a last path node in a path being traversed may be selected as the target lane path for a lane planning algorithm.

Modifications, additions, or omissions may be made to FIG. 1 without departing from the scope of the present disclosure. For example in some embodiments, the environment 100 may be part of a vehicle, such as the vehicle 500 of FIGS. 5A-5D. In these and other embodiments, the vehicle may include a datastore, such as the datastores 516/528 of FIG. 5C, that may include the map data 102. In these and other embodiments, the navigational map data 104 may be obtained from a navigational mapping application run by the vehicle or another device. For example, the navigational mapping application may interface with the internet to obtain data that may be provided as part of the navigational map data 104. Alternately or additionally, the user interface 120 may be part of the vehicle, such as the human machine interface display 534 of FIG. 5C. In these and other embodiments, the vehicle operation system 130 may include one or more of the sensors and/or systems described with respect to FIGS. 5A-5D. In these and other embodiments, the routing engine 110 may be performed by instructions that are executed by a processor, such as the processor 510, CPU, 518, GPU 520, or other processing component of the vehicle 500.

Furthermore, FIG. 1 is described with respect to maps and travel of a vehicle along a route on the maps. The disclosure is not limited to just maps and travel along routes of the maps. Rather, any data structure that represents a geographical area or other area may be used in place of the maps and the vehicles may be any machine. For example, the map data 102 as described in this disclosure may be a data structure that represents a layout of an area. The area may be in a geographic region, building, vessel, mine, waterway, forest, geographic formation, or any other area that may be described by a data structure. The vehicles as described in this disclosure may be any type of machine that may traverse a navigable path in the area described by the data structure. Thus, the concepts described in this disclosure may be applied to any application where navigable paths are traversed by some type of machine and there is a first data structure with route information and a second data structure with information regarding an area associated with the route information.

Figure 2A:
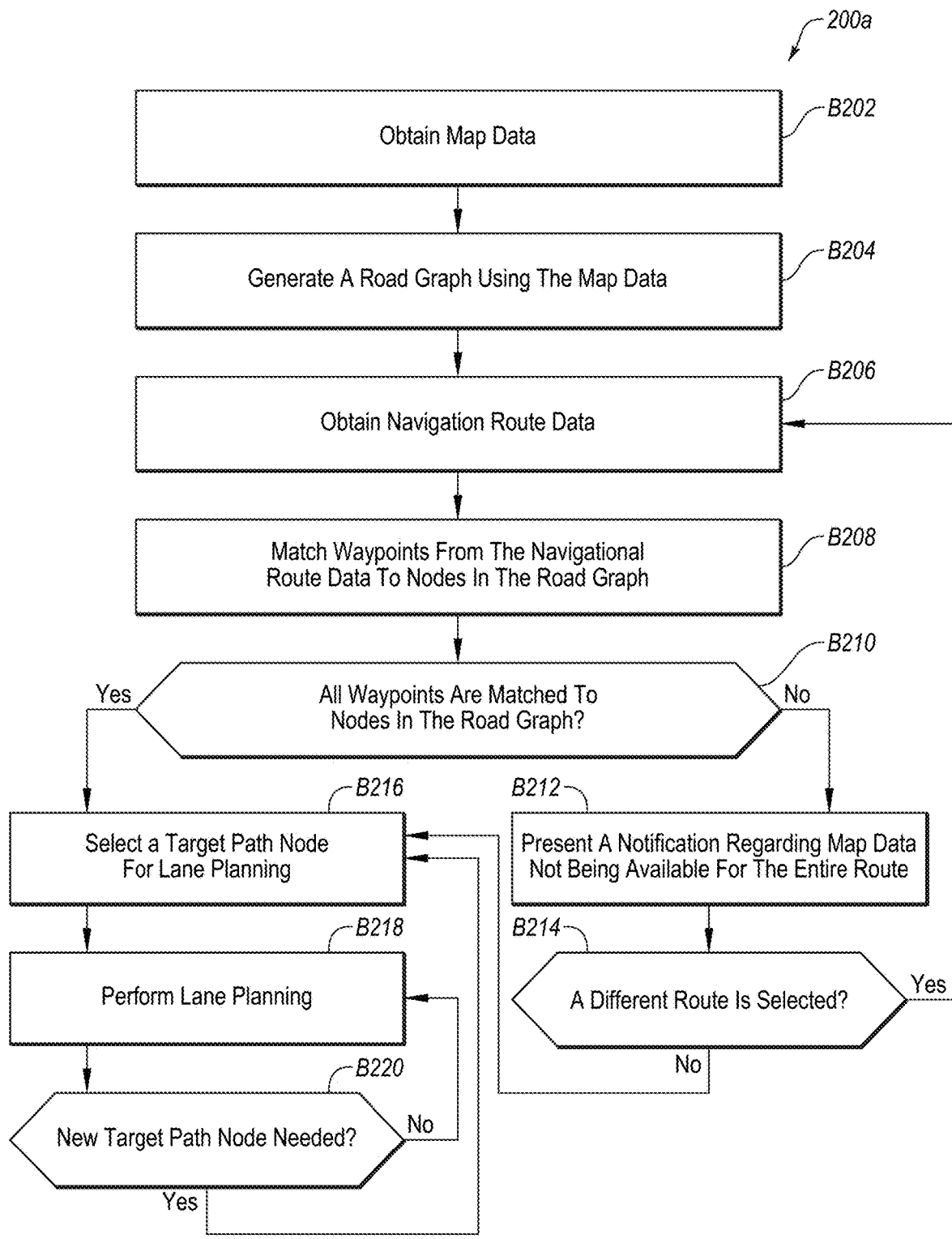
FIG. 2A illustrates an example method of map route translation and use of translated map routes, in accordance with some embodiments of the present disclosure.

Now referring to FIG. 2A, each block of method 200a, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 200a may be performed by elements such as those described with respect to the environment 100 of FIG. 1.

However, these methods may additionally or alternatively be executed by any one system, or any combination of systems, including, but not limited to, those described herein.

FIG. 2A illustrates an example method 200a of map route translation and use of translated map routes, in accordance with some embodiments of the present disclosure. The method 200a may be carried out by an environment 100, such as but not limited to the environment 100 of FIG. 1.

For the method 200a, at block B202, map data may be obtained. The map data may be HD map data that may include spatial geometric information about navigable paths (e.g., roadways) in a geographical region. The map data may not include information regarding all navigable paths in the geographical region. For example, the map data may include spatial geometric information for first portions of a roadway but no spatial geometric information for second portions of the roadway. For example, from a first mile marker to a second mile marker of a roadway the map data may include spatial geometric information but not include spatial geometric information from the second mile marker to a third mile marker of the roadway.

At block B204, a road graph may be generated using the map data. The road graph may be a graph that include nodes that represent locations along roads of the map data and edges that represent a direction of traffic flow between the locations along the roads. The road graph in some embodiments may be a directed graph.

In some embodiments, a node in the road graph may represent all of the lanes of the road. Thus, a location in a four-lane road may be represented by a single node. For example, a location of the road may be selected as a first node. The proximate node may be selected in a location in the road that is in a direction away from the first node that is parallel to the direction of traffic. An edge may connect the first node and the proximate node and have a direction that is parallel to the direction of traffic along the road. Nodes in or adjacent to branching roads and intersections may be connected to multiple nodes. A distance between nodes may vary or may be similar. For example, the distance between nodes may be in a range between 0.5 meters and 1000 meters. The distance between nodes may vary based on a configuration of the road, such as if the road has many intersections, branches, curves, etc.

Figure 3A:
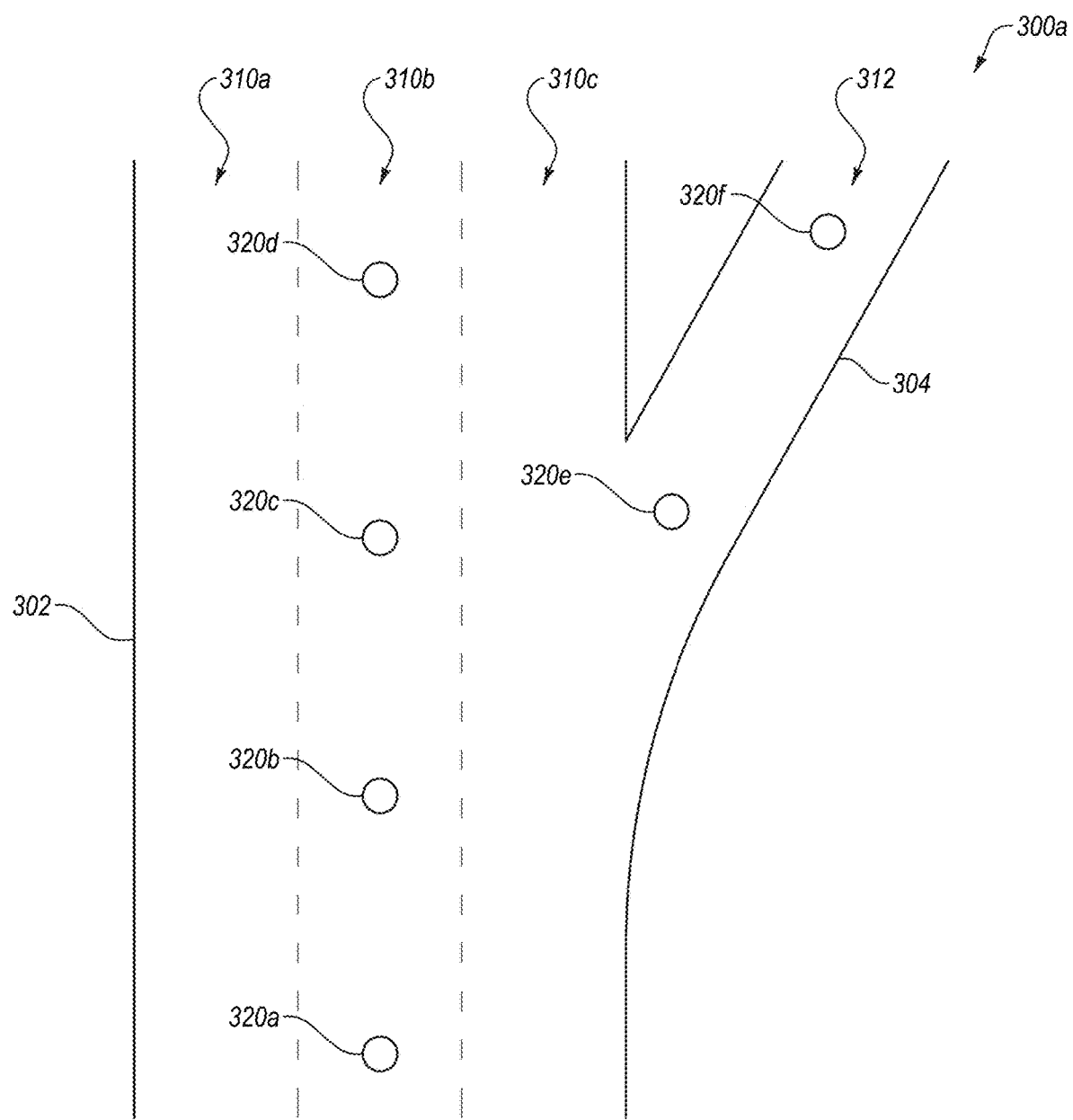
FIG. 3A illustrates an example road section, in accordance with some embodiments of the present disclosure.

FIG. 3A illustrates an example road 300a, in accordance with some embodiments of the present disclosure. The road 300a may include a first road section 302 and a second road section 304 that may branch from the first road section 302. The first road section 302 may include a first lane 310a, a second lane 310b, and a third lane 310c. The second road section 304 may include a single lane. FIG. 3A further illustrates nodes 320 from a graph that may represent the road. For example, FIG. 3A illustrates a first node 320a, a second node 320b, a third node 320c, and a fourth node 320d that may represent the first road section 302. A fifth node 320e and a sixth node 320f may represent the second road section 304.

FIG. 3B illustrates a road graph 300b based on the road 300 of FIG. 3A, in accordance with some embodiments of the present disclosure. The road graph 300b may include the first node 320a, the second node 320b, the third node 320c, the fourth node 320d, the fifth node 320e, and the sixth node 320f and may further include a first edge 330a, a second edge 330b, a third edge 330c, a fourth edge 330d, and a fifth edge 330e, referred to collectively as the edges 330. The edges 330 may connect the nodes 320. Alternately or additionally, the edges 330 may be directed edges and indicate a direction of travel along the edges 330. For example, the first edge 330a may connect the first node 320a and the second node 320b. The second edge 330b may connect the second node 320b and the third node 320c. The third edge 330c may connect the third node 320c and the fourth node 320d. The fourth edge 330d may connect the second node 320b and the fifth node 320e and the fifth edge 330e may connect the fifth node 320e and the sixth node 320f.

Returning to a discussion of FIG. 2A, at block B206, navigation route data may be obtained. The navigation route data may be obtained from a navigational application. The navigation route data may include multiple waypoints that define a route for travel by a vehicle along roads in a geographical region. In some embodiments, the waypoints and the HD map may both be defined in the same coordinate system. Alternately or additionally, the waypoints and the road graph constructed from the HD map may both be defined in the same coordinate system.

FIG. 3C illustrates the road graph of FIG. 3B with waypoints 340 from a navigational map, in accordance with some embodiments of the present disclosure. The waypoints 340 may define a route and may include a first waypoint 340a, a second waypoint 340b, a third waypoint 340c, a fourth waypoint 340d, a fifth waypoint 340e, and a sixth waypoint 340f.

Figure 2B:
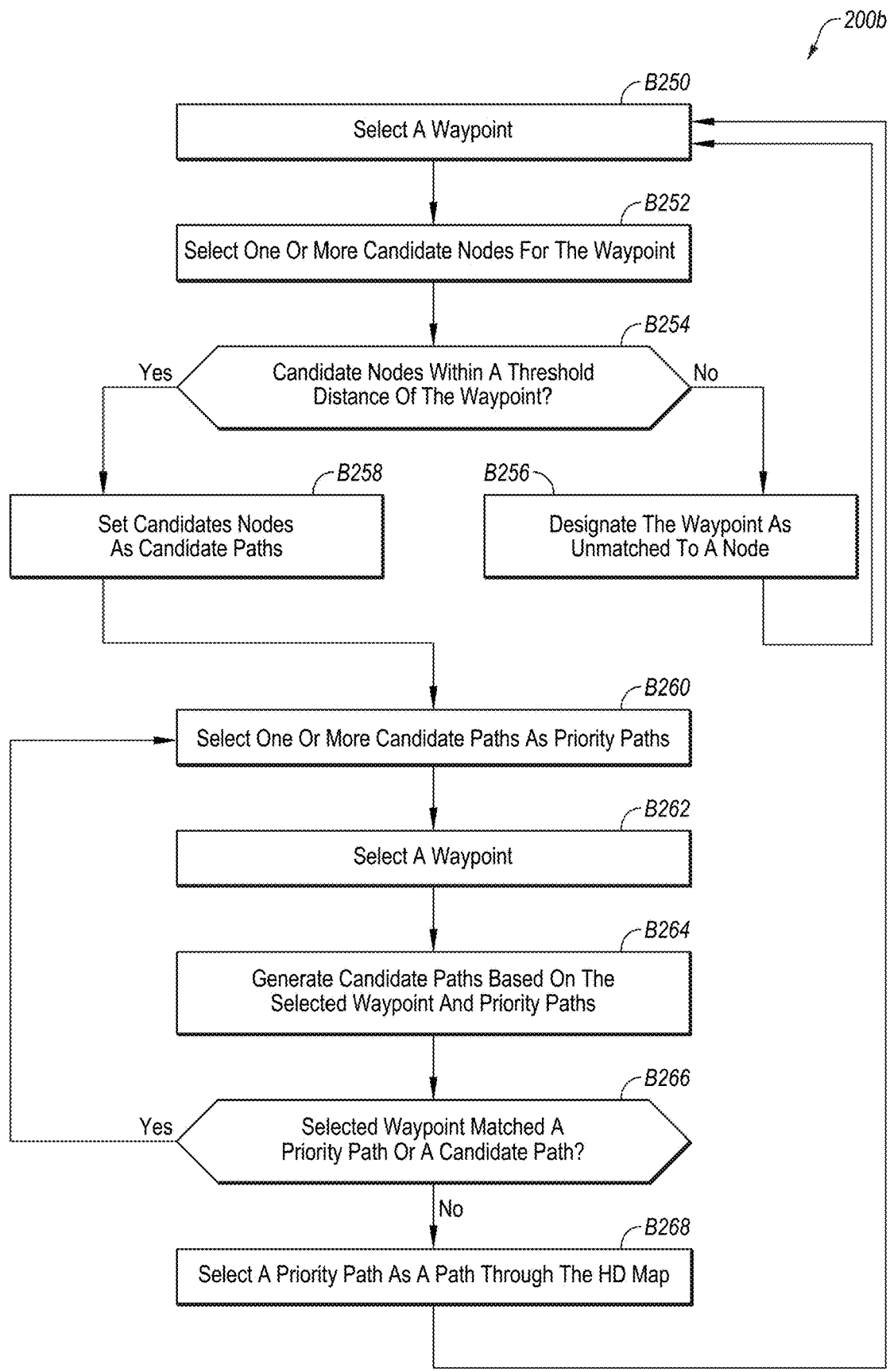
FIG. 2B illustrates an example method to translate routes between maps, in accordance with some embodiments of the present disclosure.

At block B208, waypoints from the navigational route data may be matched to nodes in the road graph. The waypoints from the route may be matched to the nodes in the road graph based on distances between the waypoints and the nodes. The nodes that match to the waypoints may be selected as path nodes. In these and other embodiments, the selected path nodes that the edges therebetween may form a path through the map data that follows the route defined by the waypoints. Other nodes may also be selected as path nodes based on the other nodes corresponding to nodes that match to waypoints. Alternately or additionally, other edges may be selected as path edges. FIG. 2B illustrates an example method 200b to match waypoints from the navigational route data to nodes in the road graph.

At block B210, it may be determined if all of the waypoints are matched to nodes in the road graph. For example, when the map data does not include data for every portion of the geographic region through which the route passes, some waypoints of the route may not be matched to nodes in the road graph.

In response one or more of the waypoints being unmatched with any nodes in the road graph, the method 200a may proceed to block B212. In response to all of the waypoints being matched to nodes in the road graph, the method 200a may proceed to block B216.

At block B212, a notification regarding map data not being available for the entire route may be presented. The notification may be presented so that a user may be aware that map data is not available for the entire route. The notification may present any information that may be associated with the map data not being available for the entire route. For example, the information may indicate adjustments in the autonomous behavior of a vehicle based on the map data not being available for the entire route. In these and other embodiments, an option may be presented to a user to select a different route for which map data may be available or more map data may be available.

At block B214, it may be determined if a different route is selected. For example, a user interface may obtain input from a user to select a different route. In response to a different route being selected, the method 200a may proceed to block B206. In response to a different route not being selected, the method 200a may proceed to block B216.

At block B216, a target path node may be selected for lane planning. The target path node may be a particular distance from a current location of a vehicle performing the lane planning. The particular distance may vary based on the road to which the target path node corresponds. For example, the distance may be greater when the road is an interstate freeway than a residential street. In these and other embodiments, the target path node may be selected to be a last node of a path even when the particular distance is not met.

At block B218, lane planning may be performed based on a lane graph that includes information about lanes of the road between the current location of a vehicle performing the lane planning and the target path node.

At block B220, it may be determined if another target path node is needed. For example, the target path node may be selected such that that target path node is within a particular range from a vehicle that is performing the lane planning. For example, the range may be 2000 meters to 3000 meters. The scope of the range may vary and may have a low-end threshold of 5 meters and a high-end threshold of 100,000 meters. In these and other embodiments, when the target path node is outside of that range another target path node that is within the range may be selected.

In response to another target path node being needed, the method 200a may proceed to block B216. At block B216, another target path node may be selected for lane planning. In response to another target path node not being needed, the method 200a may proceed to block B218. At block B218, the lane planning may continue to be performed or executed based on the selected target path node.

Modifications, additions, or omissions may be made to the method 200a without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 200a may include additional blocks or fewer blocks.

For example, in some embodiments, the method 200a may not include blocks B210, B212, and B214. Alternately or additionally, in some embodiments, the blocks B210, B212, and B214 may be replaced by a system that automatically determines if all waypoints are matched to nodes in the road graph. In response to all waypoints not being matched to nodes in the road graph, the system may determine if a new route is to be obtained. The new route may be obtained based on user preferences. For example, a user preference may allow a certain portion of waypoints to not being matched. Alternately or additionally, a user preference may allow for certain types of waypoints, such as waypoints corresponding to highway and interstates to not be matched.

As another example, in some embodiments, the method 200a may not include blocks B216, B218, and B220. In these and other embodiments, the method 200a may perform other operational functions based on the path defined in the map data.

FIG. 2B illustrates an example method 200b to translate route information between maps and/or data structures representative of a geographic area, in accordance with some embodiments of the present disclosure. The method 200b may be carried out by a routing engine, such as but not limited to the routing engine 110 of FIG. 1.

For the method 200b, at block B250, a waypoint may be selected. The waypoint may be a location along a route from a navigational application.

At block B252, one or more candidate nodes for the waypoint may be selected. The candidate nodes may be nodes from the road graph based on an HD map. The candidate nodes may be selected based on the candidate nodes being a shortest distance from the waypoint.

At block B254, it may be determined if the candidate nodes are within a threshold distance of the waypoint. The threshold distance may be determined based on the distance between the nodes in the road graph, the distance between the waypoints in the route, and/or the geographic area that includes the candidate nodes and the waypoint. In response to the candidate nodes not being within the threshold distance, the method 200b may proceed to block B256. In response to the candidate nodes being within the threshold distance, the method 200b may proceed to block B258.

At block B256, the waypoint may be designated as unmatched to a node. The waypoint being unmatched may indicate that the road graph does not include a node that may be matched to the waypoint. The road graph not including a node that may be matched to the waypoint may indicate that the HD map does not include data for a location that corresponds to the location of the waypoint. As a result, when a vehicle traverses the route at the waypoint, adjustments to the autonomous behavior of vehicle may occur.

At block B258, the candidate nodes may be set as candidate paths. Candidate paths may be paths through the road graph that include one or more nodes and one or more edges.

At block B260, one or more candidate paths may be selected as priority paths. The candidate paths may be selected as priority paths based on the path costs of the candidate paths. In these and other embodiments, the candidate paths with the lowest path costs may be selected as priority paths. For example, the candidate paths with path costs within a threshold of the candidate path with the lowest path cost may be selected as priority paths. In these and other embodiments, the path costs may be based on distances between the waypoints and the road graph. In some embodiments, the path costs may be a cumulation of the shortest distances between each waypoint and the road graph. In these and other embodiments, the shortest distances between each waypoint and the road graph may be distances between the waypoints and the nodes or the edges of the road graph. After selection of the priority paths, the remaining candidate paths may be erased such that the remaining candidate paths may not be again considered as priority paths.

At block B262, another waypoint may be selected. The waypoint may be a location along the route from the navigational application. In some embodiments, the waypoint may be the next waypoint along the route adjacent to the previously selected waypoint.

At block B264, candidate paths may be generated based on the selected waypoint and priority paths. In some embodiments, the candidate paths may add an additional edge and node to each of the priority paths. For example, a priority path may include nodes N1 and N2 and edge E1. The road graph may include nodes N3 and N4 coupled to node N2 through edges E2 and E3, respectively. Thus, two candidate paths may be constructed. A first candidate path may include N1, N2, and N3 and a second candidate path may include N1, N2, and N4.

Alternately or additionally, a priority path may become a candidate without an addition of an edge or a node based on the selected waypoint. Alternately or additionally, multiple edges and nodes may be added to one or more of the priority paths to create the candidate paths. As a result, some of the candidate paths may have more nodes than other of the candidate paths. In these and other embodiments, a number of candidate paths constructed may depend on the road graph. For example, if the road graph branches, a number of candidate paths created for a priority path may be equal to the number of branches. In these and other embodiments, a number of edges and nodes added to priority paths in creating the candidate paths may vary based on the selected waypoint. In these and other embodiments, the number of edges and nodes added to a priority path may not be more than a threshold number. The threshold number may be selected based on one or more characteristics of the selected waypoint. In these and other embodiments, a path cost may be constructed for each of the candidate paths.

At block B266, it may be determined if the selected waypoint matches a priority path or a candidate path. The selected waypoint may match a priority path or a candidate path based on the waypoint being within the threshold distance of a node or edge of one of the priority paths or candidate paths. In response to the selected waypoint matching a priority path or candidate path, the method 200b may proceed to block B260. In response to the selected waypoint not matching a priority path, the method 200b may proceed to block B268.

At block B268, a priority path may be selected as a path through the HD map. The priority path may be selected based on the priority path with the smallest path cost. The priority path may be selected as a path through the HD map because the selected waypoint not matching a priority path may indicate that the waypoint is unmatched such that the road graph does not include a node that may be matched to the waypoint. The road graph not including a node that may be matched to the waypoint may indicate that the HD map does not include data for a location that corresponds to the location of the waypoint. As a result, the path currently being matched to the route may end. Note that multiple paths may be constructed to match multiple different portions of the route. For example, a route may include a first portion, followed by a second portion, and ending with a third portion. In this example, a first path may match the first portion of the route, a second path may match the third portion of the route, and no portion of the HD map may match the second portion of the route.

An example of the method 200b is now provided with respect to FIG. 3C. In block B250, the first waypoint 340a may be selected. In block B252, the candidate nodes may be the first node 320a and the second node 320b. In block 254, both the first node 320a and the second node 320b may be within the threshold distance of the first waypoint 340a such that the method 200b may proceed to block B258. In block B258, the first node 320a and the second node 320b may be set as candidate paths. In block B260, the first node 320a and the second node 320b may be selected as priority paths. In block B262, the second waypoint 340b may be selected. In block B264, the second waypoint 340b may be determined to be within a threshold distance of both the first node 320a and the second node 320b. In block B264, the second node 320b may be added to the first node 320a to make a first candidate path, the third node 320c may be added to the second node 320b to make a second candidate path, and the fifth node 320e may be added to the second node 320b to make a third candidate path.

In block B260, the first candidate path of first node 320a and second node 320b may be selected as a priority path and the other candidate paths may be erased. The method 200b may continue in a similar manner with respect to the third waypoint 340c to return again to block B262. In block B262, the fourth waypoint 340d may be selected. In block B266, the fourth waypoint 340d may be determined to not be within a threshold distance of the priority paths. In block B268, the priority path may be selected as the first path through the HD map and the method 200b may proceed to block B250. In block B250, the fifth waypoint 340e may be selected and the method 200b may continue.

Modifications, additions, or omissions may be made to the method 200b without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 200b may include additional blocks or fewer blocks. As an example, the blocks B264 and B266 may be performed in overlapping time periods. For example, it may be determined if the waypoint matches a priority path. In response to a waypoint not matching a priority path, one or more candidate paths may be constructed using the priority paths. It may then be determined if the waypoint matches one of the candidate paths.

Figure 4:
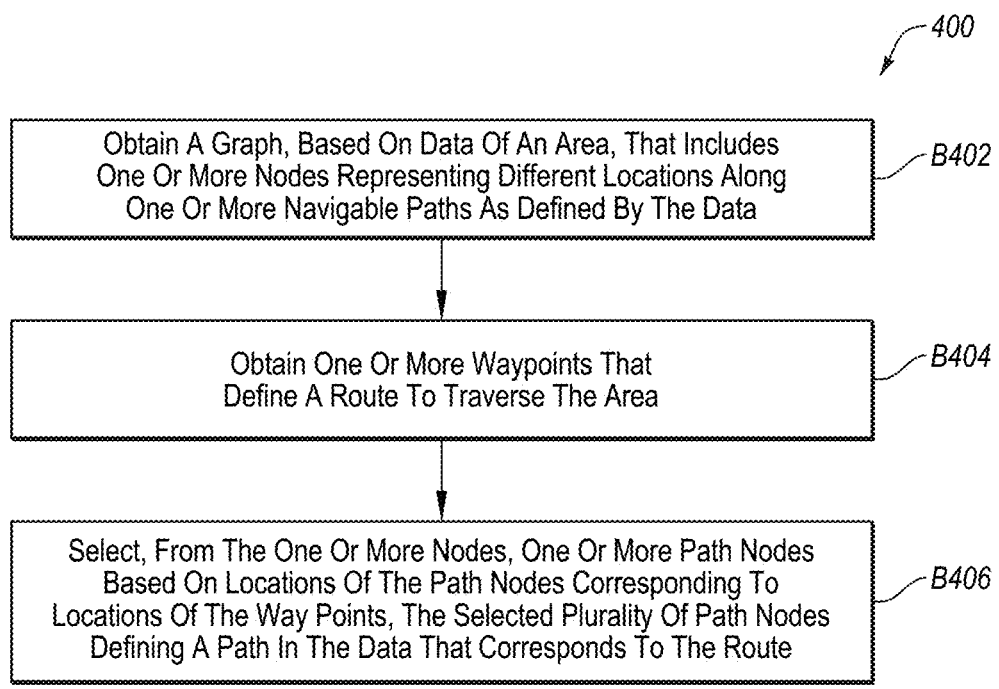
FIG. 4 is a flow diagram showing a method to translate route information between data structures, in accordance with some embodiments of the present disclosure.

FIG. 4 is a flow diagram showing a method 400 to translate route information between data structure representative of an area, in accordance with some embodiments of the present disclosure. The method 400 may be carried out via a routing engine, such as but not limited to the routing engine 110 of FIG. 1.

For the method 400, at block B402, a graph based on data of an area may be obtained. In these and other embodiments, the graph may include one or more nodes representing different locations along navigable paths as defined by the data. In some embodiments, the data may be data structure representing a high-definition map of the area. In these and other embodiments, the area may be geographical region. Alternately or additionally, the area may be in a building, vessel, mine, waterway, forest, geographic formation, or any other area that may be described by a data structure.

At block B404, one or more waypoints that define a route to be traversed in the area may be obtained. In some embodiments, the waypoints may be obtained from a navigational mapping application.

Alternately or additionally, the waypoints may be obtained from a data structure that includes one or more routes through the area of interest. Alternately or additionally, the waypoints may be obtained from a routing application that may generate routes in an area of interest. For example, the data structure may include routes through a warehouse that may be traversed by a robot for moving items within the warehouse. In these and other embodiments, the waypoints may be locations within the warehouse that may be followed to a particular item in the warehouse.

At block B406, one or more path nodes may be selected from the nodes based on locations of the path nodes corresponding to locations of the way points. In these and other embodiments, the selected path nodes and the edges therebetween may define a path in the data that corresponds to the route. In some embodiments, a location of a path node may correspond to a location of a way point based on the location of the path node being closer to the location of the way point than locations of other of the nodes. In some embodiments, other nodes may also be selected as path nodes based on the other nodes corresponding to nodes that correspond to locations of the way points.

Modifications, additions, or omissions may be made to the method 400 without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

For example, in some embodiments, the method 400 may not include B406 but may instead include selecting, from the nodes, one or more path nodes based on the path nodes each corresponding to one or more of the waypoints. In these and other embodiments, the selected path nodes and the edges therebetween may define a path in the map data that corresponds to the route. In these and other embodiments, a node may correspond to a waypoint and may be selected as a path node based on a correlation between a location of the node and a location of the way point. Alternately or additionally, the selecting the path nodes may include selecting the path nodes that minimizes a distance between the path nodes and the waypoints.

For example, in some embodiments, the method 400 may further include choosing a path node from the selected path nodes based on a current position of a vehicle (e.g., the vehicle 500 of FIGS. 5A-5D) along the path in the map data and adjusting an autonomous behavior of the vehicle based on information from the map data about a portion of the path between the current position of the vehicle and the chosen path node. In these and other embodiments, the method 400 may further include determining one or more waypoints to which none of the nodes correspond. In these and other embodiments, the path node may be chosen based on the path node being the node that corresponds to a waypoint directly adjacent to the one or more waypoints to which none of the nodes correspond.

As another example, in some embodiments, the method 400 may further include determining one or more waypoints to which none of the nodes correspond and adjusting a source of data used for self-maneuvering operations of the vehicle when the vehicle reaches the one or more waypoints to which none of the nodes correspond.

As another example, in some embodiments, the method 400 may further include determining one or more waypoints to which none of the nodes correspond and obtaining feedback from a user to select one or more second waypoints that define a second route for travel by the vehicle in the geographical region. The method 400 may also include selecting, from the nodes, one or more second path nodes that each correspond to one or more of the second waypoints. In these and other embodiments, the selected second path nodes may define a second path in the map data that corresponds to the obtained second route.

Example Autonomous Vehicle

Figure 5A:
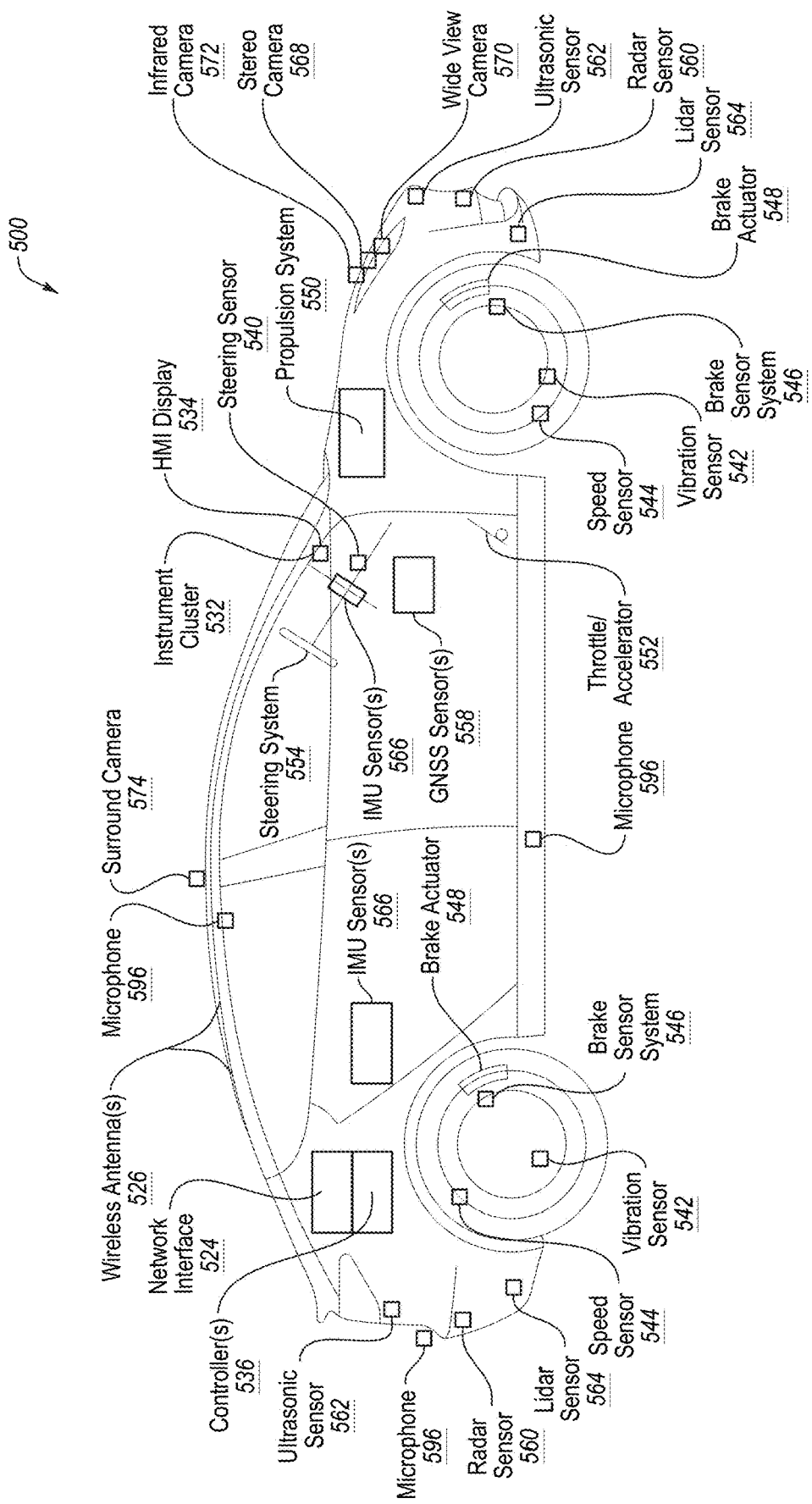
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU (s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
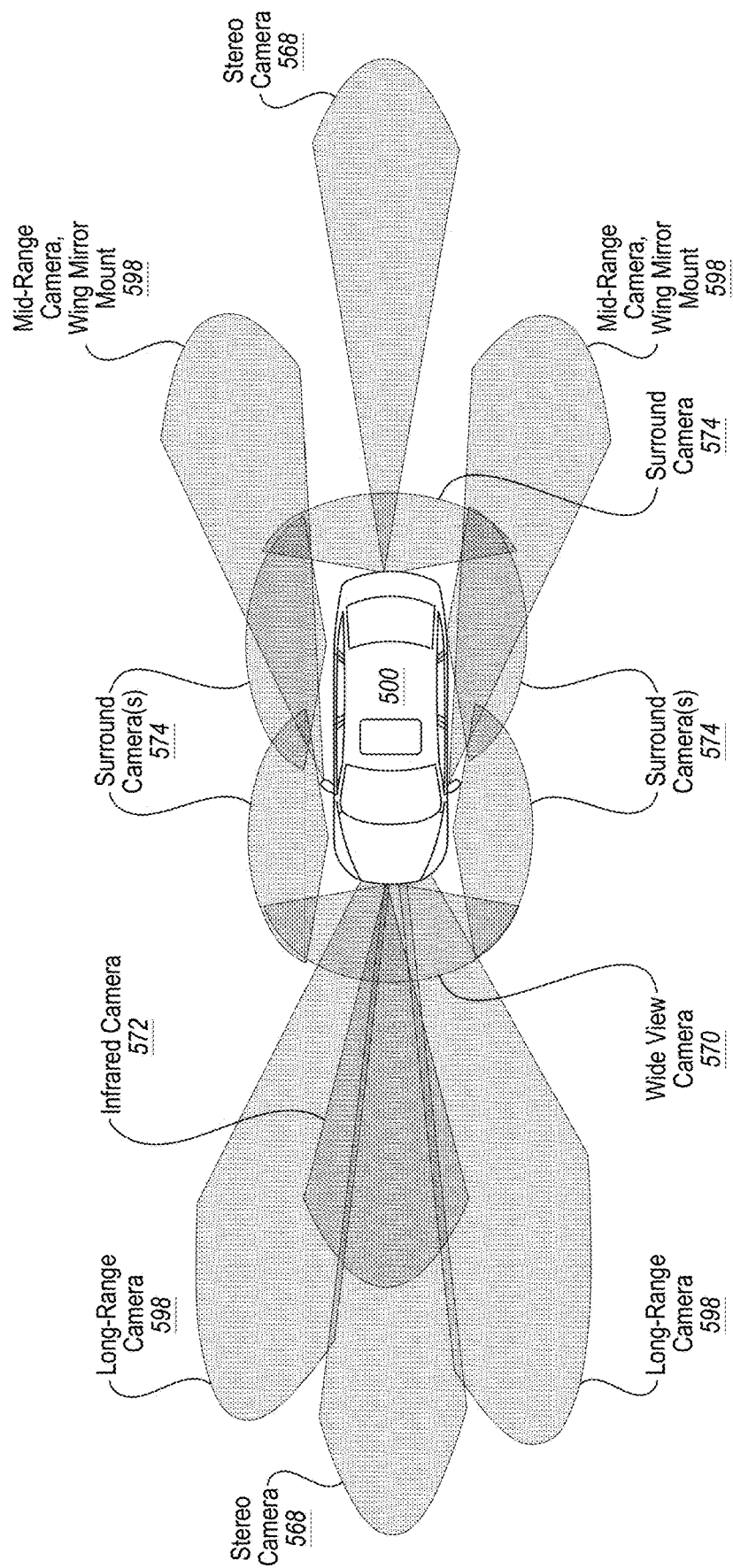
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
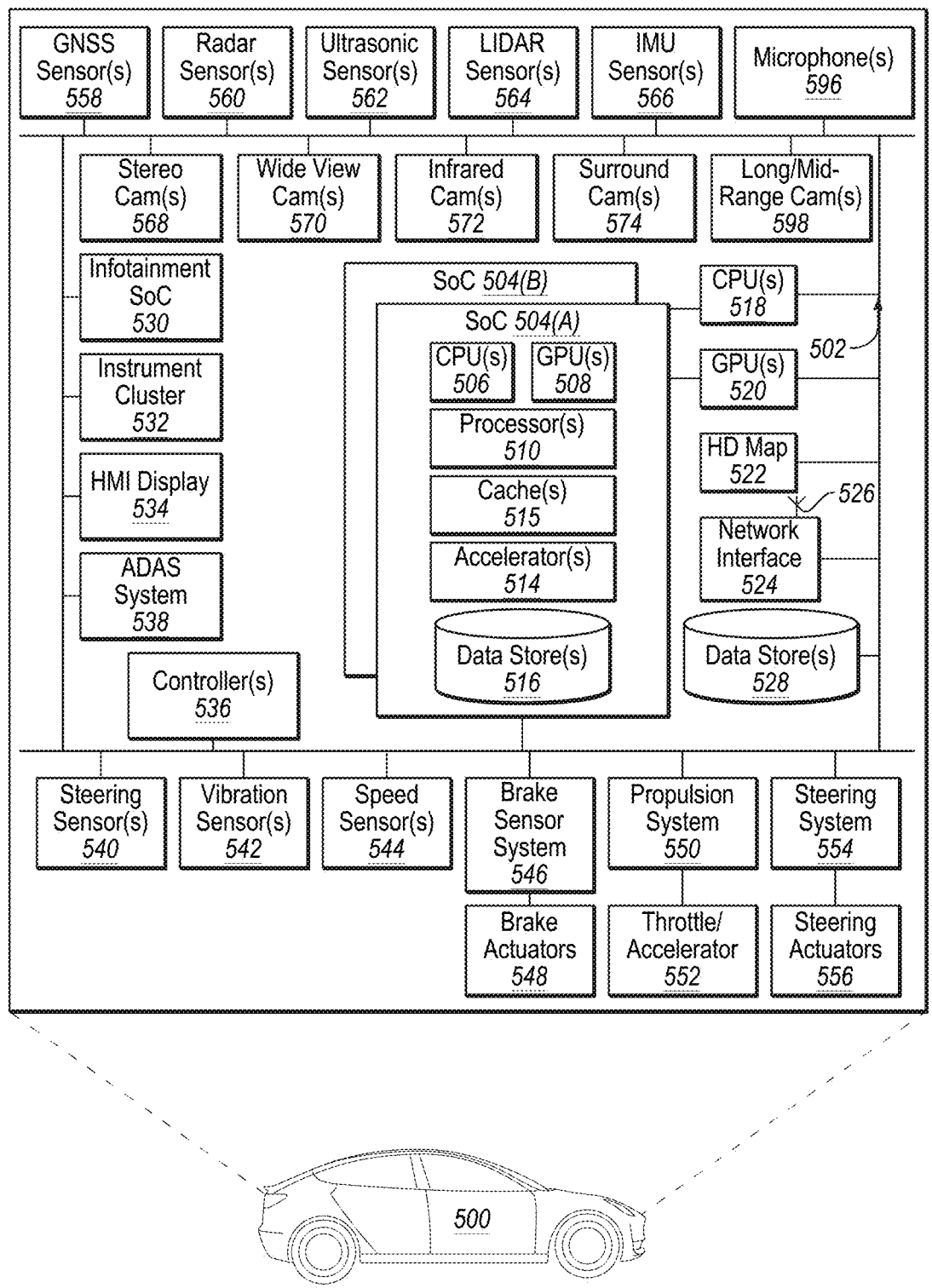
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API (s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDRS).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform)

to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping, and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
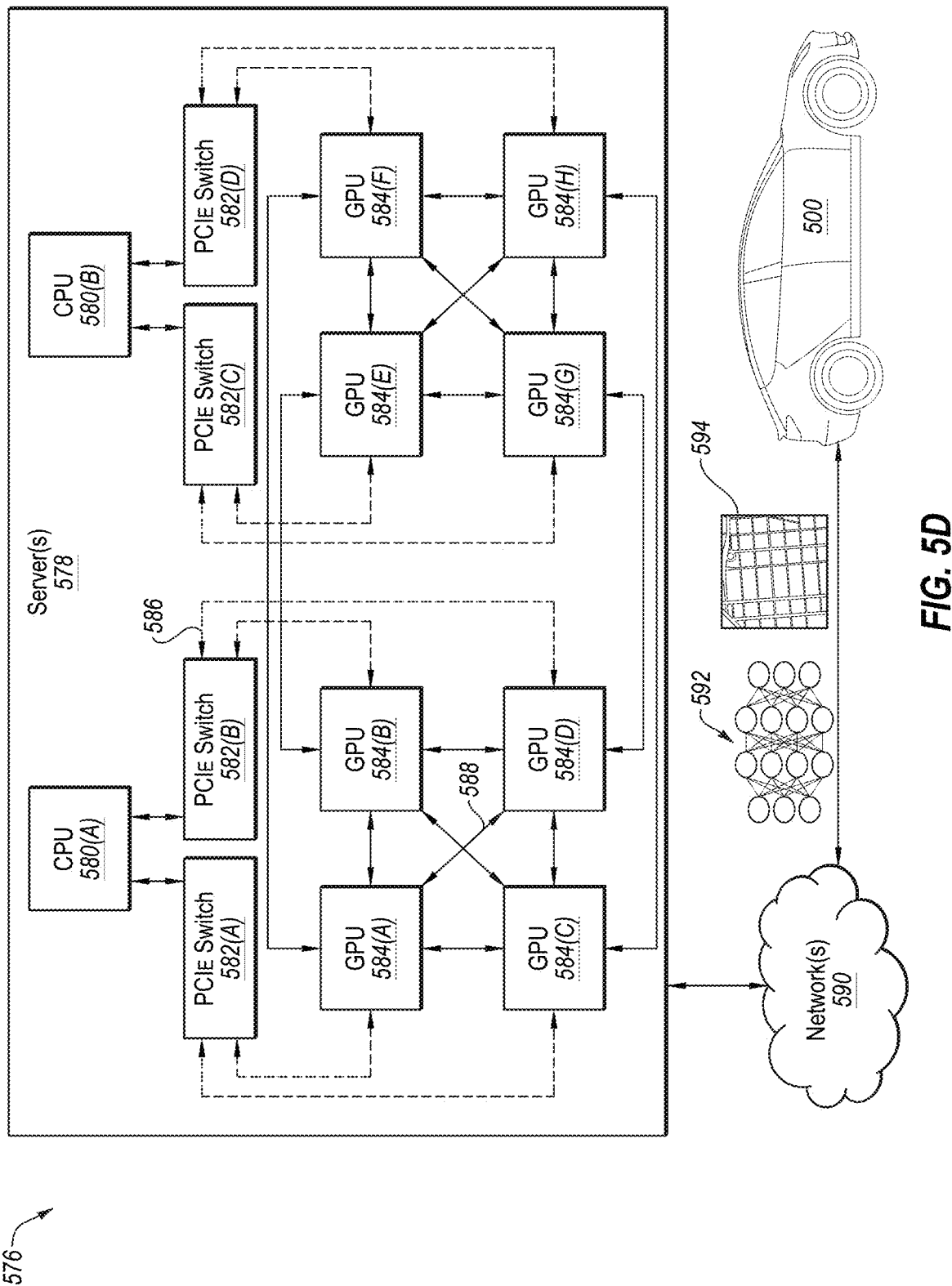
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include multiple GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
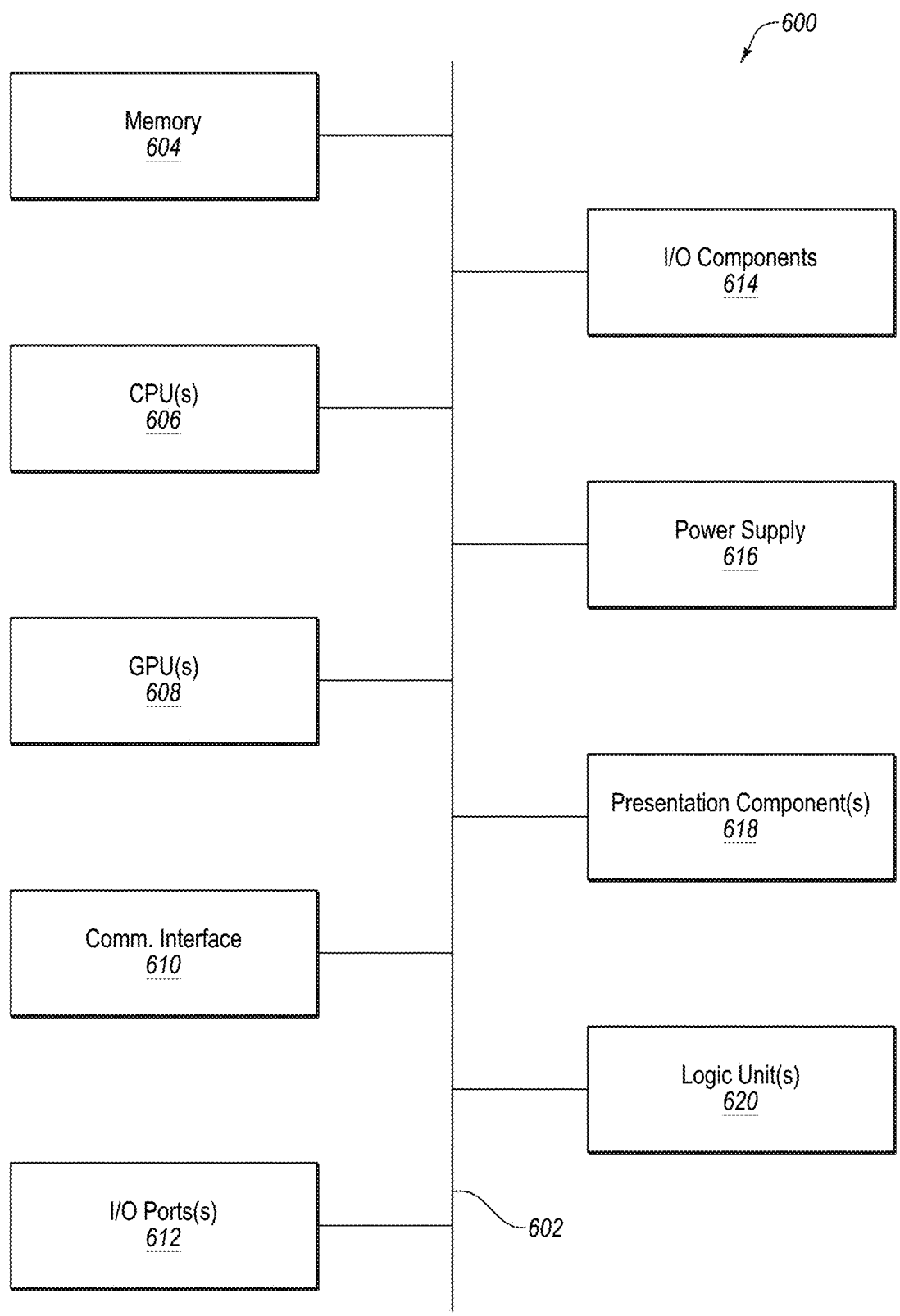
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
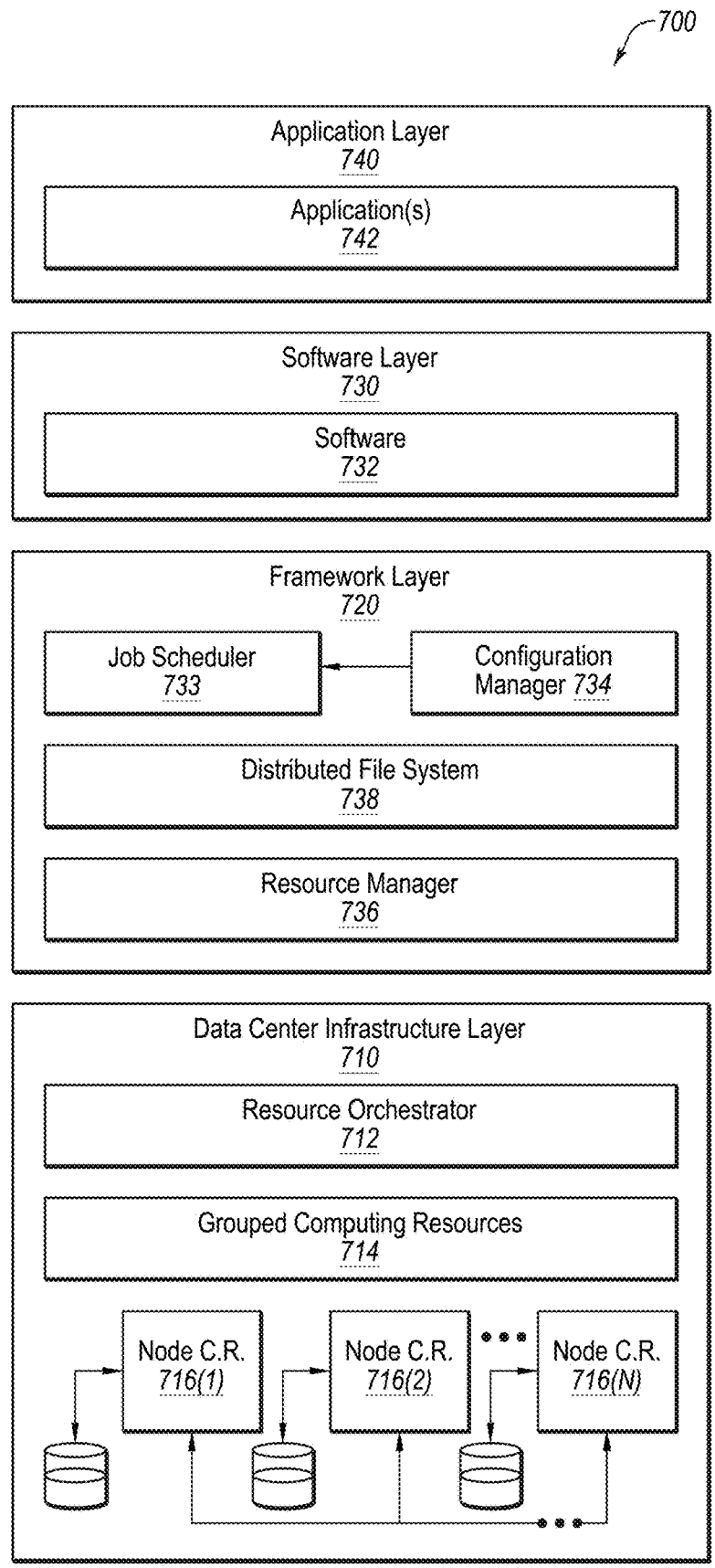
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-916(N), where "N" represents any whole, positive integer. In at least one embodiment, node C.R.s 716(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-916(N) may correspond to a server having one or more of the above-mentioned computing resources. In addition, in some embodiments, the node C.R.s 716(1)-9161(N) may include one or more virtual components, such as vGPUs, vCPUs, and/or the like, and/or one or more of the node C.R.s 716(1)-916(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-916(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-916(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-916(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processors to perform operations comprising:
obtaining spatial geometric information about one or more navigable paths in an area;
obtaining a plurality of first waypoints that define a route for travel by an ego-machine in the area;
selecting, from a plurality of candidate nodes corresponding to a graph associated with the one or more navigable paths, a set of path nodes to define a particular navigable path of the one or more navigable paths, the selecting of the set of path nodes including:
matching one or more first waypoints of the plurality of first waypoints to one or more candidate nodes of the plurality of candidate nodes;
selecting, for inclusion in the set of path nodes, the one or more candidate nodes that are matched with the one or more first waypoints;
in response to determining that at least one first waypoint is not matched with any of the candidate nodes, obtaining a plurality of second waypoints that correspond to an adjustment to the route;
matching at least one second waypoint of the plurality of second waypoints to at least one candidate node of the plurality of candidate nodes; and
selecting for inclusion in the set of path nodes, the at least one candidate node that is matched with the at least one second waypoint; and
adjusting an autonomous behavior of the ego-machine based at least on the particular navigable path.

2. The system of claim 1, wherein the adjusting of the autonomous behavior includes adjusting a source of data used for self-maneuvering operations of the ego-machine.

3. The system of claim 2, wherein the operations further comprise: providing a notification of the adjustment of the source of data.

4. The system of claim 1, wherein the plurality of first waypoints, the plurality of second waypoints, the route, and the adjustment to the route are determined using navigational map data corresponding to a navigational mapping application and the spatial geometric information is determined using high-definition map (HD map) data.

5. The system of claim 1, wherein the matching of the one or more first waypoints to the one or more candidate nodes is based at least on correlations between one or more respective locations corresponding to the one or more candidate nodes and one or more respective locations corresponding to the one or more first waypoints.

6. The system of claim 1, wherein the matching of the one or more first waypoints to the one or more first candidate nodes is based at least on a distance between one or more respective locations corresponding to the one or more candidate nodes and one or more respective locations corresponding to the one or more first waypoints.

7. The system of claim 1, wherein the obtaining of the plurality of second waypoints is based at least on
feedback from a user corresponding to the adjustment of the route.

8. The system of claim 1, wherein the one or more processors comprise one or more parallel processing units integrated as a component of the ego-machine.

9. A method comprising:
selecting, from a plurality of candidate nodes corresponding to a graph associated with one or more navigable paths, a set of path nodes to define a particular navigable path of the one or more navigable paths, the selecting of the set of path nodes including:
matching one or more waypoints of a plurality of waypoints to one or more candidate nodes of the plurality of candidate nodes, the plurality of waypoints defining a route for travel by an ego-machine;
selecting, for inclusion in the set of path nodes, the one or more candidate nodes that are matched with the one or more waypoints; and
selecting one or more additional path nodes to at least partially further define the particular navigable path based at least on:
at least one waypoint of the plurality of waypoints not corresponding to any of the one or more candidate nodes as determined from the matching, and
one or more additional waypoints corresponding to an adjustment to the route; and
adjusting an autonomous behavior of the ego-machine based at least on the particular navigable path.

10. The method of claim 9,
further comprising adjusting a source of data used for self-maneuvering operations of the ego-machine in response to determining that at least one waypoint is not matched to any of the candidate nodes.

11. The method of claim 9, wherein:
the one or more waypoints correspond to a navigational mapping application; and
the graph is generated based at least on a high-definition map.

12. The method of claim 9, wherein the matching is based at least on one or more respective locations corresponding to the one or more waypoints corresponding to one or more respective locations corresponding to the one or more candidate nodes.

13. One or more processors comprising:
processing circuitry to perform operations comprising:
running a mapping application to obtain a plurality of waypoints that define a route to be traversed by an ego-machine in an area, the route and the plurality of waypoints being defined with respect to map data corresponding to the mapping application;
obtaining a graph, based at least on high-definition data of the area, that includes one or more nodes representing different locations along one or more navigable paths as defined by the high-definition data, locations of the one or more waypoints being defined in a coordinate system used by the high-definition data; and
selecting, from the one or more nodes corresponding to the high-definition data, one or more path nodes based at least on locations that correspond to the one or more path nodes corresponding to locations that correspond to the one or more waypoints, the one or more path nodes defining a navigable path in the high-definition data of the area that corresponds to the route, selecting of the one or more path nodes including:
determining that at least one waypoint of the plurality of waypoints does not correspond to any of the one or more nodes; and
selecting, in response to the determining that at least one waypoint of the plurality of waypoints does not correspond to any of the one or more nodes, one or more additional path nodes based at least on one or more additional waypoints corresponding to an adjustment to the route; and
causing the ego-machine to perform one or more autonomous operations based at least on the navigable path as defined in the high-definition data.

14. The one or more processors of claim 13, wherein the operations further comprise:
adjusting a source of data used for self-maneuvering operations of the ego-machine when the ego-machine reaches one or more locations corresponding to one or more waypoints to which none of the one or more nodes correspond.

15. The one or more processors of claim 13, wherein the processor is part of one or more of:
a control system for an autonomous or semi-autonomous machine;
a perception system for an autonomous or semi-autonomous machine;
a system for performing simulation operations;
a system for performing deep learning operations;
a system for generating synthetic data;
a system for generating multi-dimensional assets using a collaborative content platform;
a system implemented using an edge device;
a system implemented using a robot;
a system incorporating one or more virtual machines (VMs);
a system implemented at least partially in a data center; or
a system implemented at least partially using cloud computing resources.

16. The method of claim 9, further comprising providing a notification to a user that map data used for performing autonomous driving operations will be limited at locations that correspond to the at least one waypoint that is not matched to any of the candidate nodes.

17. The method of claim 9, wherein the adjusting of the autonomous behavior includes limiting autonomous driving operations.

18. The method of claim 9, wherein the adjusting of the autonomous behavior includes obtaining an adjustment to the route and including one or more additional candidate nodes in the set of path nodes based at least on the adjustment to the route.

* * * * *